(12) United States Patent
Gao et al.

(10) Patent No.: US 9,111,565 B2
(45) Date of Patent: Aug. 18, 2015

(54) DATA STORAGE DEVICE WITH BOTH BIT PATTERNED AND CONTINUOUS MEDIA

(75) Inventors: Kaizhong Gao, Eden Prairie, MN (US);
Olle Heinonen, Eden Prairie, MN (US);
Wenzhong Zhu, Apple Valley, MN (US)

(73) Assignee: Seagate Technology LLC, Cupertino, CA (US)

(*) Notice: Subject to any disclaimer, the term of this patent is extended or adjusted under 35 U.S.C. 154(b) by 897 days.

(21) Appl. No.: 12/354,932

(22) Filed: Jan. 16, 2009

(65) Prior Publication Data

US 2010/0182713 A1 Jul. 22, 2010

(51) Int. Cl.
G11B 5/596 (2006.01)
G11B 5/82 (2006.01)
B82Y 10/00 (2011.01)
G11B 5/74 (2006.01)

(52) U.S. Cl.
CPC . *G11B 5/82* (2013.01); *B82Y 10/00* (2013.01); *G11B 5/743* (2013.01)

(58) Field of Classification Search
None
See application file for complete search history.

(56) References Cited

U.S. PATENT DOCUMENTS

| | | | | |
|---|---|---|---|---|
| 4,802,050 A * | 1/1989 | Miyabayashi et al. | ........ | 360/135 |
| 4,977,472 A * | 12/1990 | Volz et al. | .................. | 360/78.14 |
| 5,212,798 A * | 5/1993 | Kanda | ........................... | 711/112 |
| 5,296,995 A * | 3/1994 | Yonezawa et al. | ............ | 360/135 |
| 5,319,507 A * | 6/1994 | Umebayashi et al. | ..... | 360/77.03 |
| 5,355,270 A * | 10/1994 | Umebayashi et al. | ........ | 360/135 |
| 5,463,758 A * | 10/1995 | Ottesen | ......................... | 711/114 |
| 5,766,718 A * | 6/1998 | Matsuda et al. | ........... | 428/848.5 |
| 5,978,335 A | 11/1999 | Clark et al. | ..................... | 369/54 |
| 6,088,200 A * | 7/2000 | Morita | ........................... | 360/135 |
| 6,104,566 A * | 8/2000 | Stephenson | ................ | 360/73.03 |
| 6,204,983 B1 * | 3/2001 | Ito | ................................. | 360/66 |
| 6,233,110 B1 * | 5/2001 | Suzuki | ........................ | 360/73.03 |
| 6,298,016 B1 | 10/2001 | Otsuka | .......................... | 369/14 |
| 6,313,969 B1 * | 11/2001 | Hattori et al. | ................ | 360/135 |
| 6,421,195 B1 * | 7/2002 | Rubin et al. | ..................... | 360/48 |
| 6,483,660 B1 * | 11/2002 | Akagi et al. | ................. | 360/98.01 |
| 6,577,812 B1 | 6/2003 | Kikuchi et al. | ................ | 386/105 |
| 6,587,298 B1 * | 7/2003 | Yamada | ........................ | 360/72.1 |
| 6,614,608 B1 * | 9/2003 | Belser et al. | ..................... | 360/48 |
| 6,754,017 B2 * | 6/2004 | Rettner et al. | ................... | 360/51 |
| 6,999,279 B2 * | 2/2006 | Lundstrom | .................... | 360/131 |
| 7,079,341 B2 * | 7/2006 | Kistler et al. | .................... | 360/46 |
| 7,236,324 B2 * | 6/2007 | Albrecht et al. | ................. | 360/75 |
| 7,403,355 B2 * | 7/2008 | Soeno et al. | ................... | 360/135 |
| 7,443,626 B2 * | 10/2008 | Asakura et al. | ................. | 360/64 |
| 2006/0152847 A1 * | 7/2006 | Stiles et al. | ................ | 360/97.01 |
| 2007/0008866 A1 | 1/2007 | Adams et al. | ................. | 369/126 |

* cited by examiner

*Primary Examiner* — K. Wong
(74) *Attorney, Agent, or Firm* — Westman, Champlin & Koehler, P.A.

(57) ABSTRACT

Embodiments of a single data storage device with multiple different data recording media surfaces are disclosed. In one embodiment, at least one of the data recording media surfaces is conventional, such as a continuous or discrete track recording media. Another of the data recording media surfaces is a relatively high areal density, high data rate recording media, such as a bit patterned media (BPM) recording media.

21 Claims, 11 Drawing Sheets

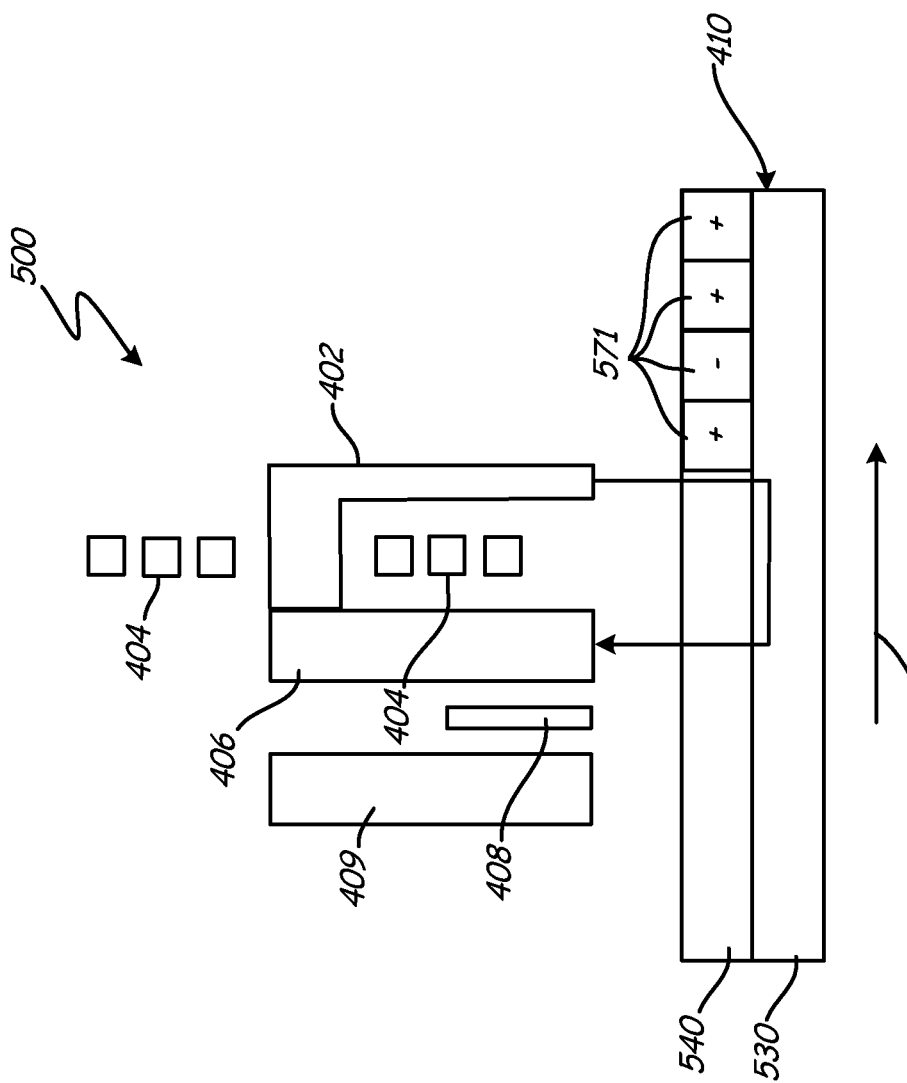

DATA STORAGE DEVICE WITH BOTH BIT PATTERNED AND CONTINUOUS MEDIA

BACKGROUND

BPM (Bit Patterned Media) data recording may achieve higher areal density than recording with conventional media, such as continuous media or discrete track media. However, BPM data recording presently presents a variety of technical challenges. For example, BPM data recording is likely to have a relatively high defect ratio and, currently, there is no effective way to map out defects before data writing. Another issue is that BPM recording is typically associated with a low Bit Aspect Ratio (BAR) and therefore, using a conventional approach, the write pole and write field may be undesirably small. Further, other areas for BPM improvement relate to challenges associated with tuning write synchronization and servo track seeking speed. At least these technical barriers bring into question, as a practical matter, whether a storage device dedicated exclusively or primarily to BPM data recording is worth the increase in areal density. Many of the technical challenges presented by BPM recording also confront other high areal density, high data rate magnetic recording technologies and therefore also affect the practical dependency of such technologies.

SUMMARY

Embodiments of a single data storage device with multiple different data recording media surfaces are disclosed. In one embodiment, at least one of the data recording media surfaces is conventional, such as a continuous recording media (e.g., longitudinal or perpendicular data recording media) or a discrete track media. Another of the data recording media surfaces is a relatively high areal density, high data rate recording media, such as a bit patterned media (BPM) recording media.

BRIEF DESCRIPTION OF THE DRAWINGS

FIG. 5 is a schematic diagram of a cross-section of a recording head writing to one example of a conventional data recording medium.

DETAILED DESCRIPTION

Figure 1:
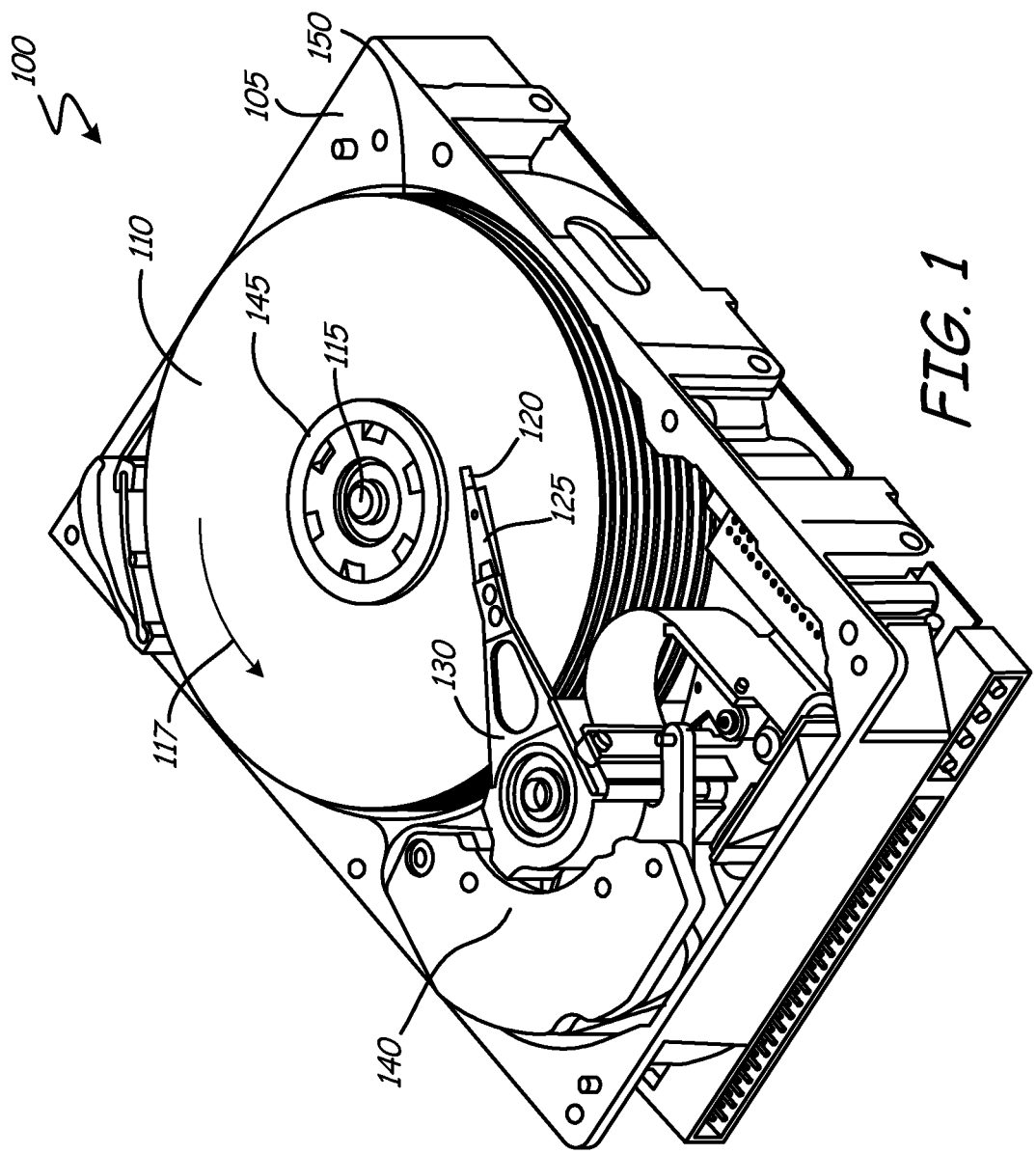
FIG. 1 is a perspective view of a data storage device.

FIG. 1 is a perspective view of a hard disc drive 100. Drive 100 is an example of a device in which some embodiments of the present disclosure may be incorporated. Hard disc drives are a common type of data storage system. While embodiments of this disclosure are described in terms of disc drives, other types of data storage systems should be considered within the scope of the present disclosure.

Disc drive 100 includes an enclosure 105. Disc drive 100 further includes a disc or medium 110. Those skilled in the art will recognize that disc drive 100 can contain a single disc or multiple discs. Medium 110 is mounted on a spindle motor assembly 115 that facilitates rotation of the medium about a central axis. The direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in an arcuate path between a disc inner diameter 145 and a disc outer diameter 150.

Figure 2:
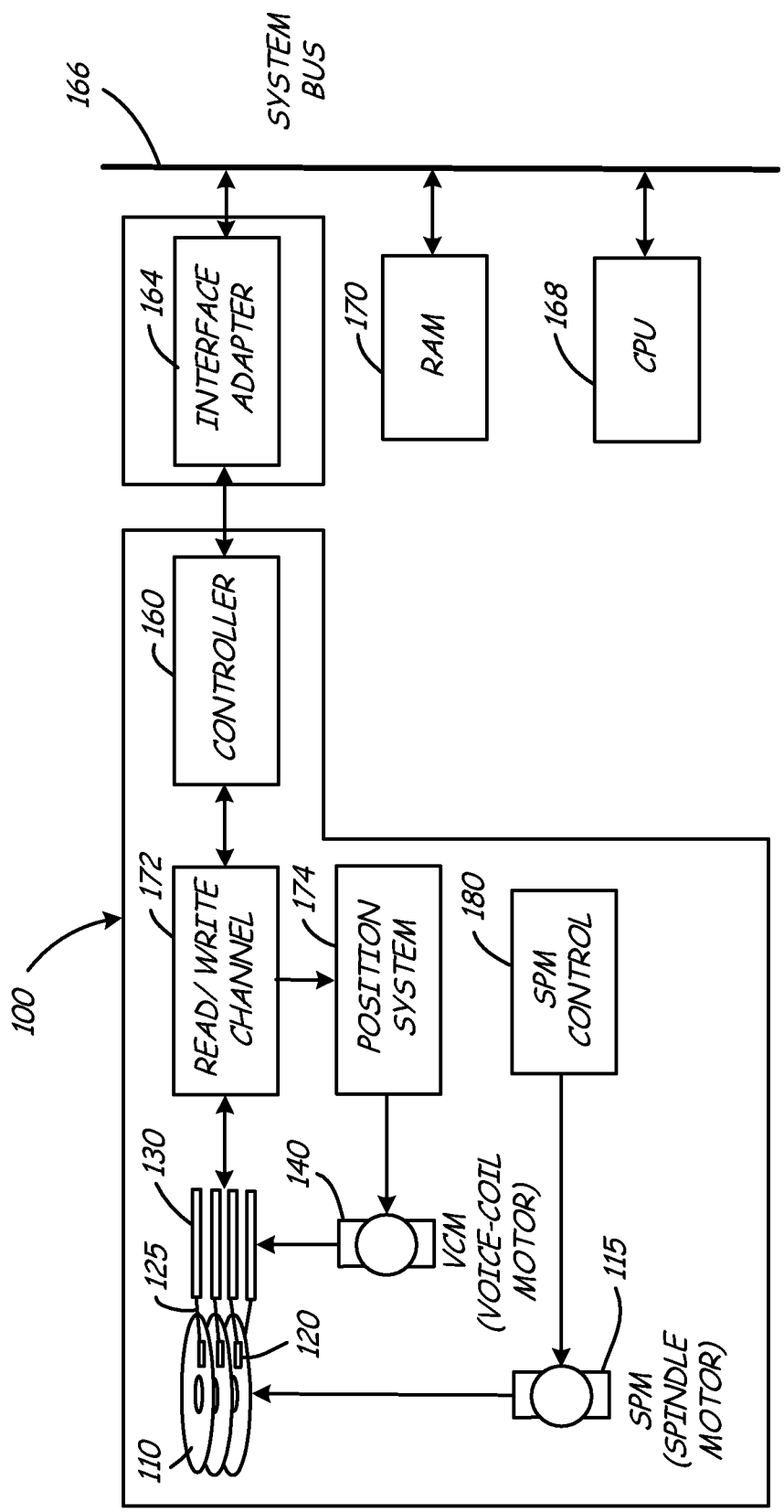
FIG. 2 is a generalized schematic diagram demonstrating a control configuration for the data storage device shown in FIG. 1.

FIG. 2 is a generalized schematic diagram demonstrating a control configuration for the data storage device 100 shown in FIG. 1. As shown in FIG. 2, device 100 includes a controller 160 that is communicatively connected (e.g., via an IDE or SCSI ribbon cable) to an interface adapter circuit 164. Interface circuit 164 is illustratively, though not necessarily, embedded on a mother-board of a host computing device or embodied on an add-in card within the computing device, though it is also contemplated that circuitry 164 could instead by included within the internal circuitry of drive 100. Using a suitable interface protocol, interface circuit 164 illustratively communicates (e.g, over a system bus 166) with a central processing unit (CPU) 168 and/or a random access memory (RAM) 170 of the host computing device using a suitable interface protocol.

Those skilled in the art will appreciate that the host computing device is shown in a very simplified form in FIG. 2. It is to be understood that the host computing device in reality is likely to have other functional components in addition to the bus 166, CPU 168 and RAM 170 shown in FIG. 2. These three basic components are intended to exemplify basic functionality known in the art as being common to many computing devices configured to conduct data storage operations in association with a data storage device such as device 100. It is to be understood that other functional components, including a variety of different input/output mechanisms, are also likely to be part of the host computing device.

Controller 160 is illustratively a top level processor that provides top level control for device 100. Broadly speaking, controller 160 may be characterized as a programmable, general purpose processor with suitable programming to direct the operation of the device 100. A read/write channel 172 illustratively includes a not illustrated preamplifier/driver circuit (preamp) that facilitates writing of data to and recovering of data from the discs 108 in a manner as described in relation to FIG. 1. To support these read/write operations, channel 172 interacts with a positioning system 174 facilitates appropriate control of voice coil motor 140 so as to precisely move sliders 120 across media 110 in a manner as described in relation to FIG. 1. In one embodiment, system 174 includes a servo circuit that provides closed loop positional control for the heads 120. In one embodiment, controller 160 is configured to interact with a spindle motor control system 180 so as to precisely monitor and/or manipulate spindle motor 115 so as to precisely control rotation (e.g., the velocity of rotation) of discs 110. In one embodiment, as will be described in below in relation to other Figures, control system 180 and/or controller 160 are configured to control motor 115 so as to vary the velocity of rotation depending on an applicable operation (e.g., read versus write) and/or depending on an applicable type of media being written two (e.g., BPM versus conventional or continuous media).

Figure 3:
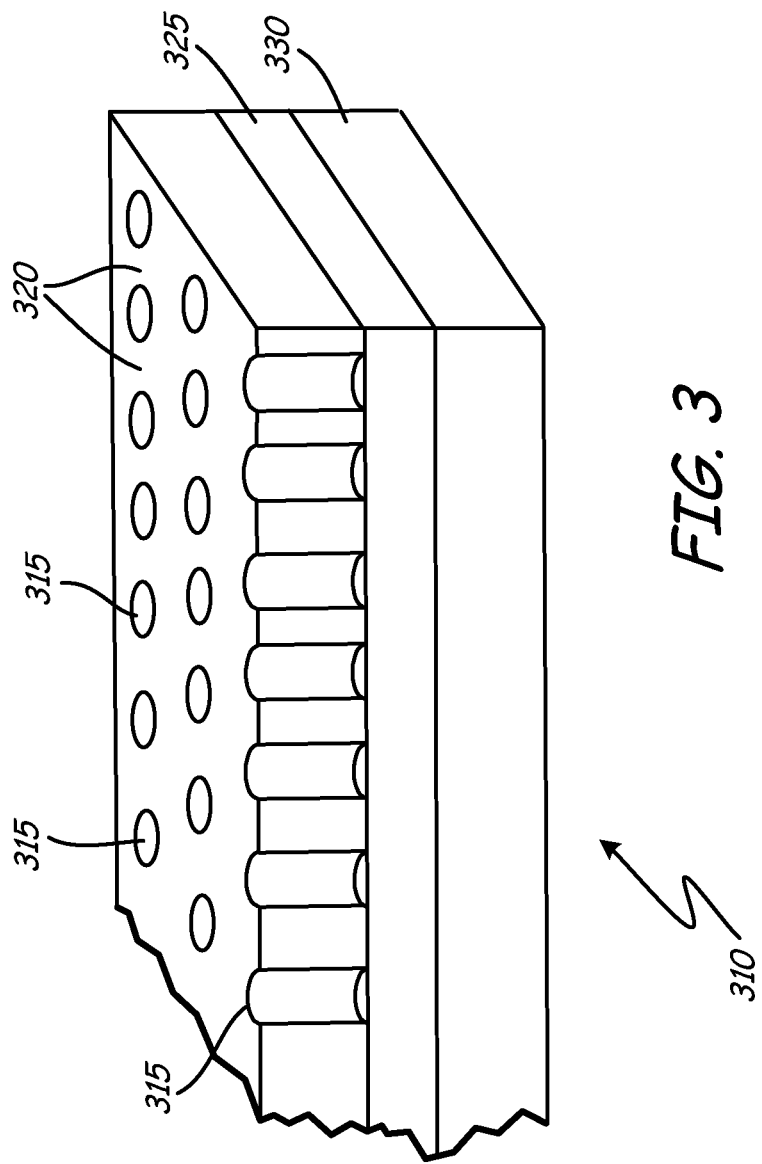
FIG. 3 is a simplified perspective view of a bit patterned medium.

FIG. 3 is a simplified perspective view of a bit patterned medium 310. Medium 310 is illustratively a medium in a disc drive such as medium 110 in FIGS. 1 and 2. Embodiments of the present disclosure may be practiced with bit patterned media such as medium 310. Types and variations of bit patterned media other than the simplified variation shown in FIG. 3 are within the scope of the present disclosure. Some embodiments of the present disclosure are also practiced with conventional media, such as discrete track recording media or media with continuous magnetic surfaces such as, but not limited to, longitudinal or perpendicular recording media. Even though some embodiments are described in the context of conventional or bit patterned media, the present invention is not limited to any particular type or variation of these types of media.

Medium 310 includes a plurality of media dots 315. Dots 315 are illustratively made from a magnetic material or materials. Dots 315 are separated from each other by a non-magnetic layer 320. Medium 310 also includes a soft magnetic underlayer 325 and a substrate 330.

Figure 4:
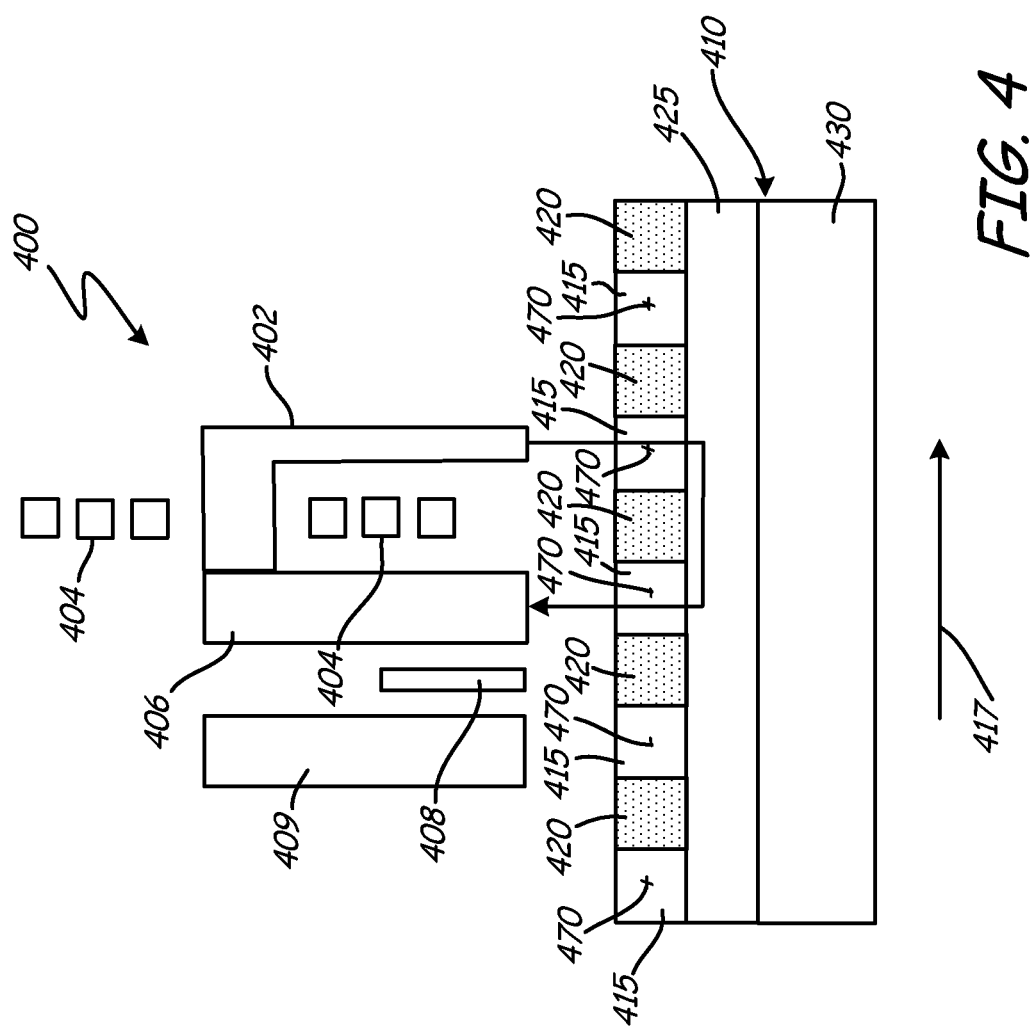
FIG. 4 is a schematic diagram of a cross-section of a recording head writing to one example of a bit patterned data recording medium.

FIG. 4 is a schematic diagram of a cross-section of a recording head 400 writing to a bit patterned medium 410. Recording head 400 is illustratively carried by a slider such as slider 120 in FIGS. 1 and 2, and bit patterned medium 410 is illustratively a storage medium such as, but not limited to, medium 110 in FIGS. 1 and 2, and medium 310 in FIG. 3. FIG. 4 is a simplified diagram only showing cross-sectional views of some of the read and write components of a recording head. Those skilled in the art will recognize recording heads commonly include other components. Some embodiments of the present disclosure may be practiced with recording heads such as recording head 400. Embodiments of the present disclosure are however not limited to such recording heads. Many various types of recording heads are known in the art, and embodiments of the present disclosure are not limited to any specific type of recording head. Embodiments of the present disclosure are practiced in all types of recording heads.

Recording head 400 includes a write pole 402, a magnetization coil 404, a return pole 406, a read element 408, and a bottom shield 409. Storage medium 410 includes media dots 415 that are illustratively media dots such as dots 315 in FIG. 3, a non-magnetic layer 420 that is illustratively a non-magnetic layer such as layer 320 in FIG. 3, a soft magnetic underlayer 425 that is illustratively an underlayer such a underlayer 325 in FIG. 3, and a substrate 430 that is illustratively a substrate such as substrate 330 in FIG. 3. Storage medium 410 rotates in the direction shown by arrow 417. Arrow 417 is illustratively a direction of rotation such as arrow 117 in FIG. 1.

In one embodiment, electric current is passed through coil 404 to generate a magnetic field. The magnetic field passes from write pole 402, through media dots 415, into underlayer 425, and across to return pole 406. The polarity of the magnetic field is illustratively reversed by reversing the polarity of the electric current passed through coil 404. The magnetic field and its polarity illustratively record a magnetization pattern in media dots 415. Magnetization patterns of dots 415 are represented by the "+" and "−" signs 470.

FIG. 5 is a schematic diagram of a cross-section of a recording head 500 writing to a conventional medium 510, in particular a continuous recording medium. In is to be understood that the term "conventional," as used herein is not to be interpreted so as to be limited to continuous recording media. Other types of conventional recording media, in particular discrete track recording media, are also to be considered within the scope of the term "conventional." A continuous recording media is described in detail herein in order to provide at least one specific example of a conventional recording media.

Conventional recording medium 510 includes a substrate 530 and a continuous magnetic layer 540. FIG. 5 includes several elements that are analogous to those shown in FIG. 4 and is numbered accordingly. However, in FIG. 5, unlike in FIG. 4, the recording head is not recording magnetization patterns to a series of media dots. Instead, recording head 500 is recording magnetization patterns to the continuous magnetic layer 540. The magnetization patterns of layer 540 are represented by the "+" and "−" signs 571. As is shown in the simplified diagram, the magnetization patterns are recorded in the continuous magnetic layer 540 and are not separated from each other by a nonmagnetic layer such as layer 420 in FIG. 4.

Certain embodiments of the present invention pertain to a single data storage device with multiple different data recording surfaces. In one embodiment, at least one of the data recording surfaces (e.g., at least one side of one disk) is a conventional media (e.g., such as described in relation to FIG. 5), and another of the data recording surfaces (e.g., at least one side of one disk) is a bit patterned media (BPM) surface (e.g., such as described in relation to FIGS. 3 and 4). Thus, within a single data storage device, a BPM surface provides high data capacity, and the surface with conventional media (e.g., continuous, discrete track or some other conventional recording media) supports a high data transfer rate. This is an improvement over a system that includes primarily conventional media (suffers at least from more limited capacity than BPM media), or a system that includes primarily BPM media (suffers at least from more limited data transfer rate).

Figure 6B:
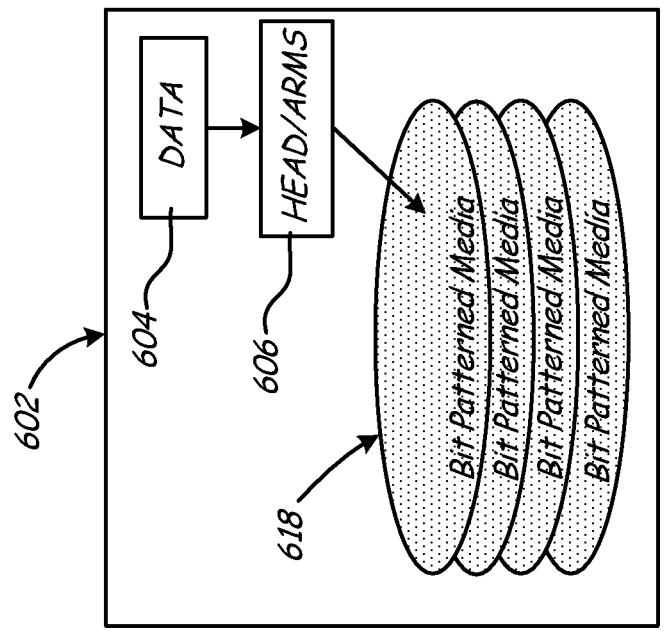
FIGS. 6A, 6B, 7A and 7B are each a schematic, simplified representations of a data storage device.
Figure 6A:
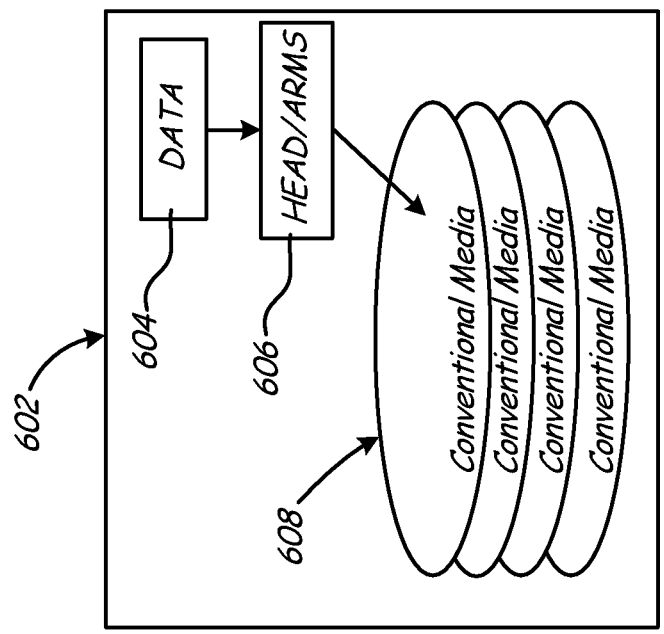

FIG. 6A is a schematic, simplified representation of a data storage device, in particular a disk drive 602. Functionally speaking, disk drive 602, is illustratively similar to disk drive 100 described in relation to FIGS. 1 and 2, though certain parts have been omitted from drive 602 for clarity and simplification. Those skilled in the art will appreciate that, consistent with the functionality of disk drive 100, data 604 is written, by heads/arms 606, to (and read from) a stack of recording media, which is illustratively a stack of disks 608. At least one individual head/arm 606 is utilized for data transactions with each surface of an individual disk 608. Data can illustratively be recorded on either or both sides of each individual disk 608.

Disk drive 602 is an example of a conventional approach with multiple disks within a single disk drive. In this case, all disk surfaces are the same and are configured to support a conventional media data recording scheme (e.g., similar to the continuous recording scheme discussed in relation to FIG. 5, or a discrete track recording scheme, etc.). In one embodiment, disks 608 are configured to support a longitudinal or perpendicular data recording scheme, which are both known in the art.

FIG. 6B is another schematic, simplified representation of disk drive 602. In this case, however, disk stack 608 has been replaced with a disk stack 618. The data recording surfaces in disk stack 618 are configured to support a bit patterned media data recording scheme (e.g., similar to the recording scheme discussed in relation to FIGS. 3 and 4).

The disk drives of FIGS. 6A and 6B have certain advantages and disadvantages relative to one another. For example, the drive of FIG. 6A is likely to have a lower storage capacity than the drive of 6B because disk stack 608 is likely to have a lower storage capacity than disk stack 618. On the other hand, disk stack 608 is likely to enable a higher data transfer rate than disk stack 618. These are just examples of tradeoffs associated with choosing one of the FIG. 6 disk drives over the other.

Figure 7B:
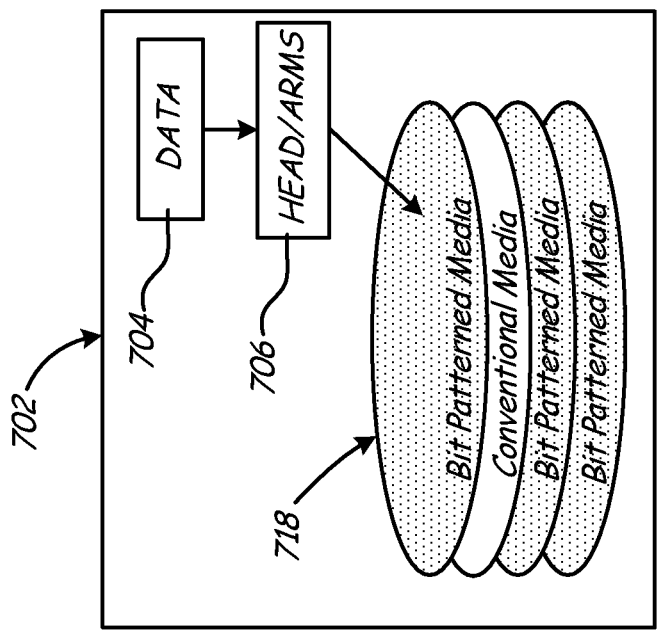
Figure 7A:
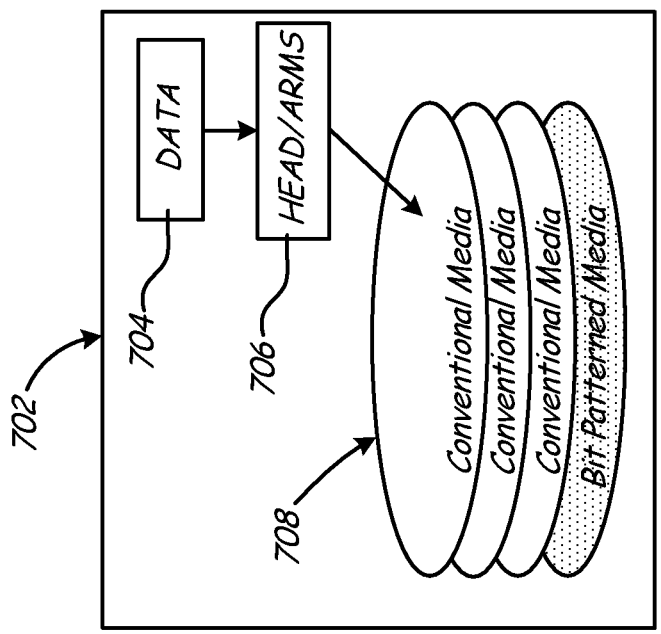

FIGS. 7A and 7B are schematic, simplified representations of a data storage device, in particular a disk drive 702. Functionally speaking, disk drive 702, is illustratively similar to disk drive 100 described in relation to FIGS. 1 and 2, though certain parts have been omitted from drive 702 for clarity and simplification. Those skilled in the art will appreciate that, consistent with the functionality of disk drive 100, data 704 is written, by heads/arms 706, to (and read from) a stack of recording media, which is illustratively a stack of disks 708. At least one individual head/arm 706 is utilized for data transactions with a surface of an individual disk 708. Data can illustratively be recorded on either or both sides of each individual disk 708.

Disk drive 702 is different than disk drive 602 in that its recording media is not entirely conventional (e.g., continuous, and/or discrete track, etc.) or bit patterned. Instead, at least one disk surface within the drive is a conventional (e.g., continuous and/or discrete track, etc.) media and other disk surfaces are a bit patterned media. The difference between FIGS. 7A and 7B is essentially the location of the conventional media, with it being on a surface of the bottom disk in a stack 708 in FIG. 7A, and being on a surface of the second from the top disk in a stack 718 in FIG. 7B.

It should be noted that embodiments of the present invention pertain, in general, to a data storage device that contains both conventional (e.g., continues and/or discrete track, etc.) and bit patterned media. It is within the scope of the present invention to allocate different disk surfaces to the two different kinds of media in any combination, including combinations that include either or both sides of a given disk. For example, it is contemplated for a single disk to have a conventional media on one side and bit patterned media on the other. It is also contemplated for multiple surfaces in a stack (e.g., both sides of one disk or one side of multiple disks) to be allocated to conventional or bit patterned media. All combinations, whether the disk stack is mostly conventional media surface, mostly bit patterned media surfaces, or an even allocation of both, are to be considered within the scope of the present invention.

Certain embodiments of the present invention pertain to data management functionality of a data storage device that, like disk drive 702, writes data to (and reads data from) a combination of both conventional (e.g., continuous and/or discrete track, etc.) and bit patterned recording media. In one embodiment, this data management functionality is facilitated by a controller (e.g., controller 160 and/or CPU 168 in FIG. 2) through execution of computer readable instructions embedded on a computer readable data storage medium (e.g., RAM 170, a data storage device attached to system buss 166 and/or data storage location within drive 100). Through this execution of instructions, the controller manages data read/write operations by controlling operations of the various components of the disk drive (e.g., components 172, 174, 180, 140, 115, etc. shown in FIG. 1).

Figure 8:
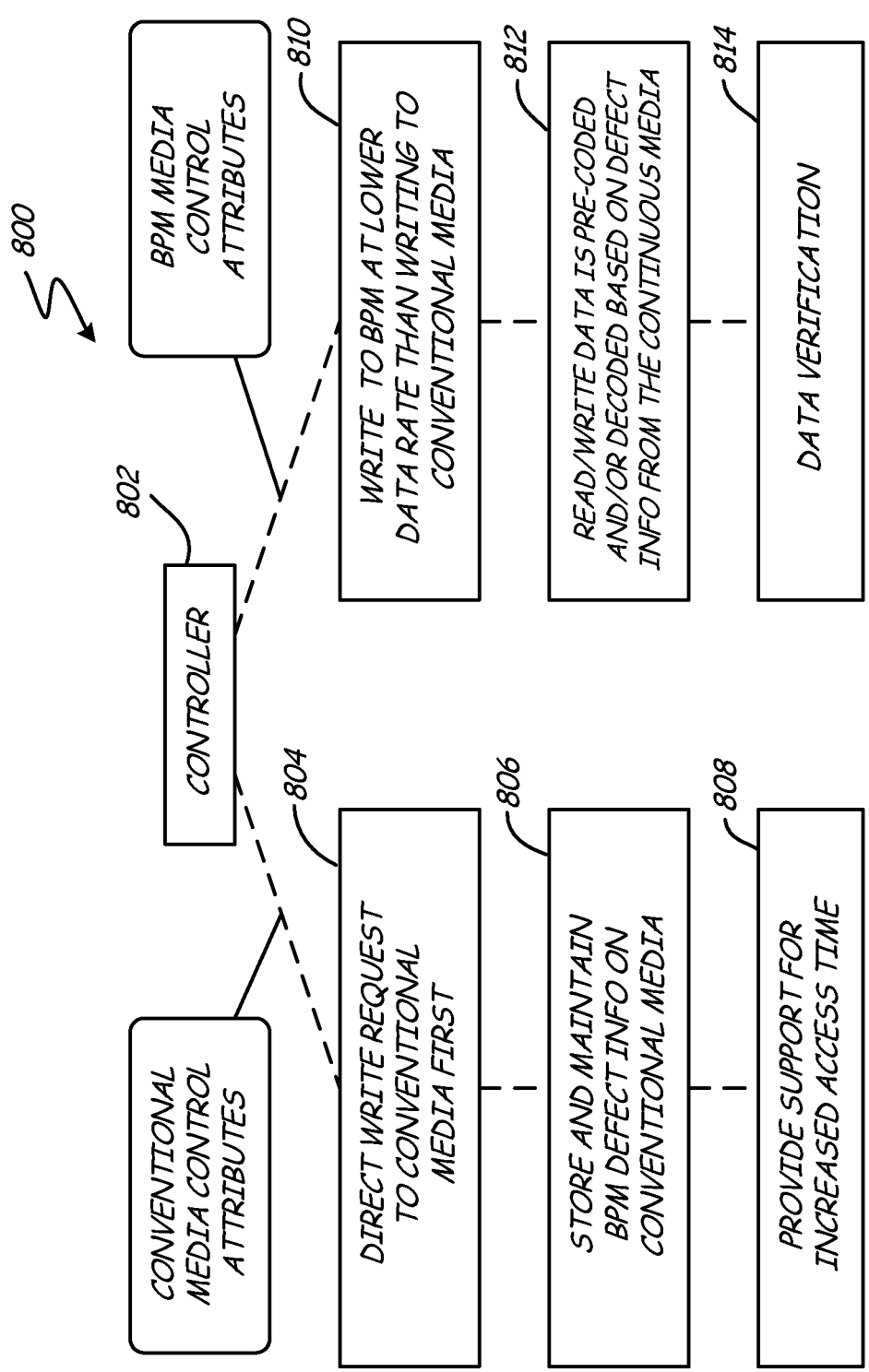
FIG. 8 is a schematic representation of a control scheme for a data storage device.

With this in mind, FIG. 8 is a schematic representation of a control scheme 800 in accordance with certain embodiments of the present invention. The mechanism of a controller is generically depicted as controller 802 with the understanding that all mechanisms that can be configured to control a data storage device are to be considered within the scope of the present invention. Specific examples of such controllers include controller 160 and/or CPU 168 shown and described herein in relation to FIG. 2.

Controller 802 illustratively executes computer readable instructions so as to manage the data storage device based on a collection of functional operating principles identified in FIG. 8 as blocks 804-814. It should be understood that it is within the scope of the present invention to configure a controller to facilitate some, all or none of the functional characteristics represented by blocks 804-810. FIG. 8 is intended to provide examples of how, in accordance with embodiments of the present invention, a data storage device containing a combination of both conventional (e.g., continuous and/or discrete track, etc.) and bit patterned recording media may be operated.

In accordance with block 804, controller 802 manages the data storage device such that writing operations are initially directed to the conventional media (e.g., the continuous media and/or discrete track, etc.) rather than the bit patterned media. In one embodiment, this means that all data is initially written on the conventional media. In accordance with block 806, defect information for the BPM media is stored on the conventional media. In one embodiment, this means all the error information for the BPM surfaces is mapped out for access from the conventional media. In accordance with block 808, as will become apparent, the conventional media is utilized to enable a relative increase in access time.

In accordance with block 810, controller 802 manages the data storage device such that the rate at which data is written to the BPM media is lower than the rate at which data is written to the conventional (e.g., the continuous and/or discrete track media, etc.). Of course, the areal density with which data is recorded to the BPM media is much larger than writing to the continuous media. Playback of data from the BPM media does not suffer at high rates, as does data writing. Therefore, controller 802 illustratively utilizes a faster rate for BPM playback than BPM writing, for example, a playback rate that is the same or increased relative to read/writes from/to the conventional media. Thus, in one embodiment, controller 802 controls and changes data read/write rates depending upon whether data is being written or playback, and depending upon the relevant media (e.g., BPM or conventional). In one embodiment, controller 802 affects the data transfer rate by interacting with a spindle motor control sub-system (e.g., item 180 in FIG. 2) so as to affect a velocity of disk rotation produced by a spindle motor (e.g., motor 115 in FIG. 2).

In accordance with block 812, the read/write data is precoded or can be decoded in light of reference information (e.g., but not limited to defect information) obtained from the conventional media. In accordance with block 814, as will become apparent, the BPM media is utilized to support data verification. In one embodiment, data verification is an added benefit of a transfer, as will be described in more detail below, of data from the conventional media to the BPM media.

In practice, some of the control functions identified in FIG. 8 as being "conventional media control attributes" actually operate in close conjunction with functions identified as being "BPM media control attributes," and vice versa.

Figure 9:
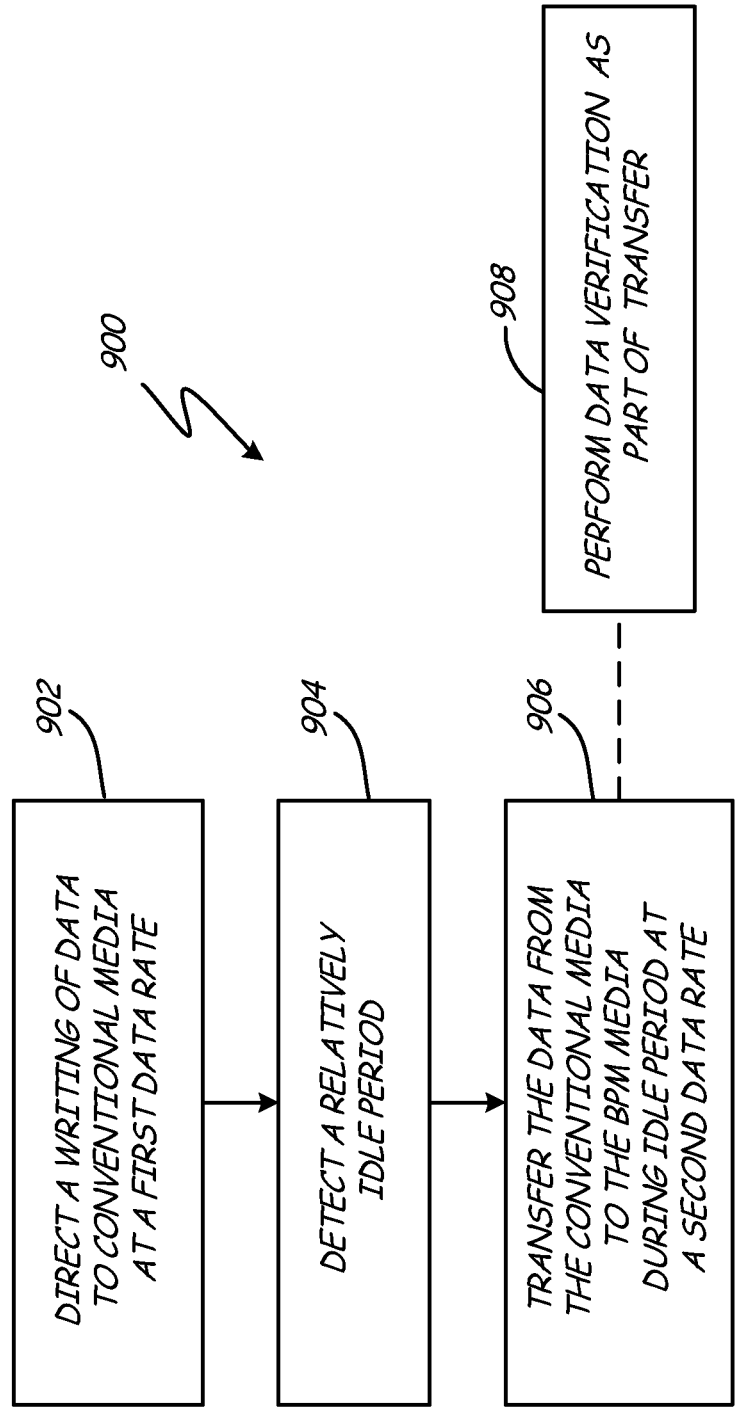
FIG. 9 is block representation of a control scheme for a data storage device.

For example, FIG. 9 is a flow chart diagram demonstrating one embodiment of a more specific control scheme 900. In accordance with block 902, a writing of data is executed such that the data is written to the conventional media. Illustratively, this is writing is done at a first data transfer rate. In accordance with block 904 there is a detection of a period of time during which the data storage device is, or is at least likely to be, idle. In accordance with block 906, during the detected idle time, the data that was initially recorded to the conventional media is transferred to the BPM media (and then illustratively, but not necessarily deleted from the conventional media). In one embodiment, this transfer is accomplished at a second data transfer rate, the second data transfer rate being a slower rate than the first data rate. In accordance with block 908, a data verification process is integrated into the data transfer as an added mechanism for policing data integrity.

Thus, in one embodiment, the controller (e.g., controller 802) is configured to write to the BPM surface (possibly but not necessarily at a reduced data transfer rate) while the data storage device is in an idle state. In this manner, the effective advantages of both a high data rate (i.e., attribute of conventional media) and high capacity (i.e., attribute of BPM media) are essentially provided by a single data recording device.

In another embodiment, not yet discussed, the controller is programmed to support a bandit approach to data management. The bandit approach illustratively involves calculating now to collect random files on the conventional media and put them into one or more large data blocks. In one embodiment, the large data block(s) are transferred from conventional to BPM media. In one embodiment, this transfer is coordinated to occur during a time period identified as idle or at least likely to be idle in terms of the active state of the data storage device.

Figure 11:
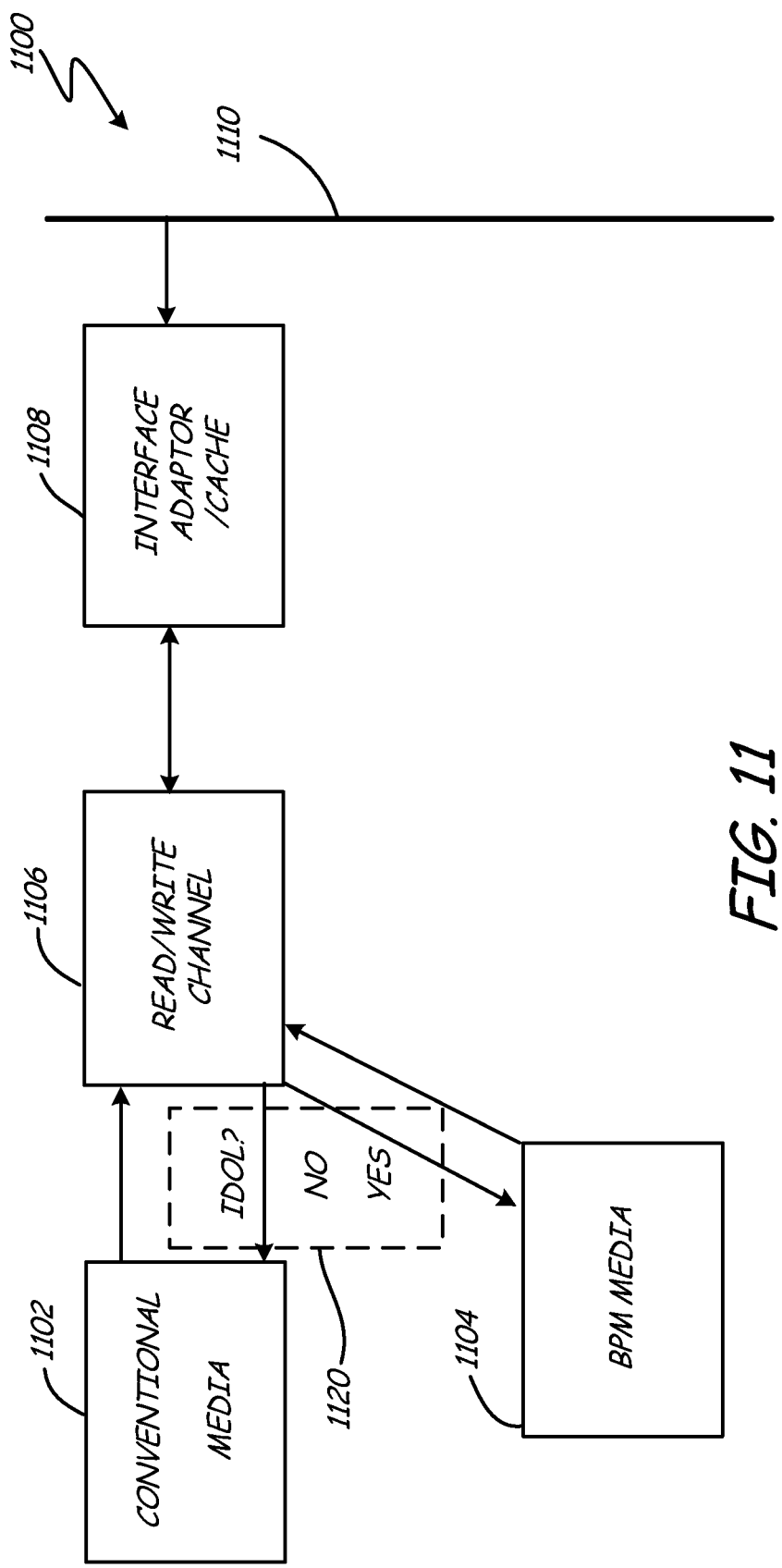
FIG. 11 is a generalized schematic diagram demonstrating a control configuration for a data storage system.

FIG. 11 is a generalized schematic diagram demonstrating another embodiment of a control configuration, this time for a data storage system 1100. Those skilled in the art will appreciate that system 1100 is similar to data storage device systems described elsewhere in the present description. However, for the purpose of simplification, system 1100 only schematically shows conventional media 1102, BPM media 1104, a read/write channel 1106, an interface adapter/cache 1108 and a system bus 1110. Those skilled in art will understand how these components are implemented in the context of a system the same or similar to the system described in relation to FIG. 2, and also in the context of storage devices that are the same or similar as the data storage devices described in relation to the other Figures described herein.

In accordance with block 1120, a determination (e.g., by a controller the same or similar to controller 802), as has been described, as to whether the system is in an idle state need only occur for a writing operation. For a playback operation, data can be directly read at any time from either or both of BPM media 1104 or conventional media 1102. For example, the need to reduce the velocity of a BPM transaction illustratively may apply only to write operations and not to playback operations. At least because it may be most desirable to reduce the velocity of a BPM write operation, it may be preferable to restrict BPM write operations to periods identified as being idle (e.g., including transfers of data from conventional media to BPM media).

A motor is not shown in FIG. 1100. It is to be understood that motion of media 1102 and 1104 can be controlled by the same motor or different motors. The motor speed for writing to (or playback from) media 1102 and 1104 can be the same (e.g., same rpm) or different. Writing and playback operations can be performed at the same or different rate (e.g., same or different rpm), this meaning on one of the media 1102/1104 or relative to each other. All variations are to be understood as within the scope of the present invention. Which variation is ideal will dependent upon factors such as, for a given implementation, target areal density, overall cost of device, error thresholds, etc. Given that linear and track density is likely to be different for BPM media relative to conventional media, there is significant flexibility in terms of choosing ideal data transfer rates (e.g., same speed is conceived of as a reasonable possibility).

It is worth mentioning that the scope of the present invention is not limited to only bit pattered and conventional media. It is contemplated that other types of data storage media can also be integrated into a given data storage device.

Figure 10:
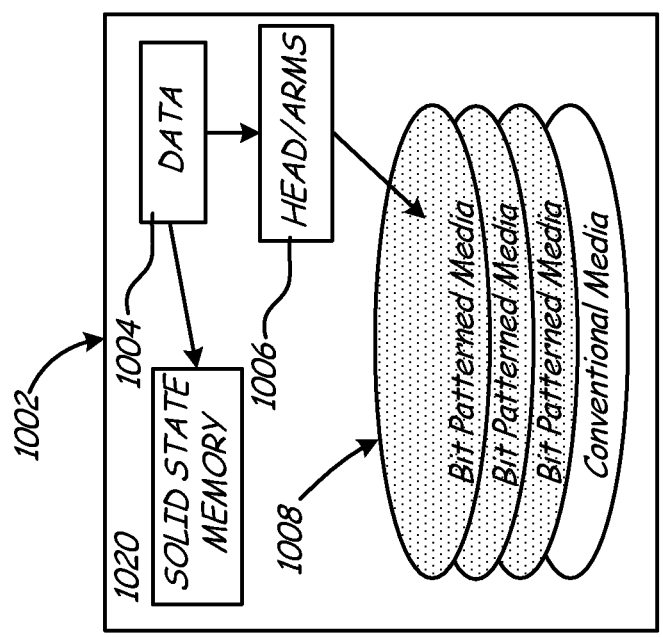
FIG. 10 is a schematic, simplified representation of a data storage device.

For example, FIG. 10 is a schematic, simplified representations of a data storage device 1002. Functionally speaking, device 1002, is somewhat similar to disk drive 100 described in relation to FIGS. 1 and 2, though certain parts have been omitted from device 1002 for clarity and simplification. Those skilled in the art will appreciate that, consistent with the functionality of disk drive 100, data 1004 is written, by heads/arms 1006, to (and read from) a stack of recording media, which is illustratively a stack of disks 1008. At least one individual head/arm 1006 is utilized for data transactions with a surface of an individual disk 1008. Data can illustratively be recorded on either or both sides of each individual disk 1008.

Device 1002 is different than disk drive 702 in that its available recording media is not entirely conventional (e.g., continuous and/or discrete track, etc.) or bit patterned, and is also not just a combination of those two types of disk media. Instead, device 1002 also includes an ability to write data 1004 to a solid state memory 1020 (e.g., but not by limitation, a flash memory). In one embodiment, a controller (e.g., controller 802) is configured to utilize memory 1020 as a data buffer to help manage initial bursts of data to be written to media 1008. It is within the scope of the present invention, however, to integrate memory 1020 in any way and for any purpose (e.g., to operate in a manner similar to the described operation of the conventional media in terms of providing an initial storage location until transfer to a BPM media). Memory 1020 also enables a relative reduction in power consumption and, potentially, an increase in reliability.

It should be emphasized that embodiments of the present invention pertain, in general, to a data storage device that contains multiple types of recording media. It is within the scope of the present invention to allocate different types of media in any combination. All combinations, whether the disk stack is mostly conventional, mostly solid state, mostly BPM, etc. are to be considered within the scope of the present invention.

Certain embodiments described and inferred to herein provide a broad range of benefits and advantages. For example, a hybrid device as described enables a high data rate due to the high data rate capacity of the conventional (e.g., continuous and/or discrete track, etc.) media with a relatively fast spindle speed. Further, a high storage capacity is also enjoyed due to the relatively high areal density provided by the BPM media. The described "bandit approach" to data management even enables further areal density. Notably, there is no read back penalty because there is no big synchronization issue in the read back process. Further, a reduction in error rate is likely because errors or defects in the BPM surface are mapped out before the data is written in. There is also relief in terms of design space and integration complexity. Because use of the BPM media with a low data rate becomes possible, the write synchronization requirement is drastically relieved and the read after write type of data verification process can be enabled, which improves reliability, design and integration space.

In addition, due to a reduction of the data rate requirement, the described bandit approach can be enabled, which will further improve head field, increase write synchronization margin and enable higher areal density. It should also be mentioned that embodiments provide a lower cost option to more reliance on solid state memory to achieve similar or same functionality. Also enabled is an improvement of servo capability, track seeking speed and accuracy for BPM data recording operations. Embodiments also reduce power consumption, especially in terms of the embodiments shown in FIG. 10, because write for BPM operations can occur at a lower data rate and disk velocity. In the FIG. 10 approach, writing can be managed so as to be directly from memory to BPM (as opposed to making the stop at the conventional layer) with a relatively low data rate and low spindle speed.

For BPM recording, certain of the described embodiments enable a relatively larger write synchronization window and support write verification to further ensure data integrity. In addition, embodiments enable higher BAR and alleviate recording head design space, and enable a higher field generated from a writer. For reading, the information can be directly retrieved from a BPM surface; and there will be no data rate penalty.

As has been previously mentioned or at least alluded to, although some embodiments of pulse writing have been described in the context of bit patterned media and/or in the context of conventional media, embodiments of pulse writing are not limited to the context in which they were described. Embodiments of pulse writing are not limited to only bit patterned media, continuous media, discrete track or to any other particular media or storage device. Embodiments of pulse writing are practiced with all types and variations of media and storage devices.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A data storage system, comprising:
a first recording surface that is a bit patterned media surface comprising non-contiguous individual bits of a recording material;
a second recording surface that is a continuous media recording surface, a discrete track media recording surface or a combination of a continuous media portion and a discrete track media portion; and
a data read/write control component that manages data read/write operations relative to both of the first and second recording surfaces.

2. The data storage system of claim 1, wherein the first recording surface is on a first disk and the second recording surface is on a second disk, the first disk being separate and distinct from the second disk.

3. The data storage system of claim 1, wherein the second recording surface stores error information that maps defects relative to the bit patterned media surface.

4. The data storage system of claim 1, wherein the data read/write control component causes a collection of data to be written to the second recording surface at a first data transfer rate, and subsequently causes the collection of data to be written to the first recording surface at a second data transfer rate, the second data transfer rate being different than the first data transfer rate.

5. The data storage system of claim 1, wherein the data read/write control component controls a spindle motor so as to cause an adjustment to an alternate rotational velocity, and wherein the alternate rotational velocity is selected based at least in part upon a determination as to which one of the first and second recording surfaces data is to be written during the alternate rotation velocity.

6. The data storage system of claim 4, wherein the second data transfer rate is greater than the first data transfer rate.

7. The data storage system of claim 1, wherein the data read/write control component causes a collection of data to be written to the second recording surface, and subsequently causes a transfer of the data collection to the first recording surface.

8. A method of managing a data storage system, the method comprising:
writing, at a first data transfer rate, a collection of data to a first data recording surface that is a continuous media recording surface, a discrete track media recording surface or a combination of a continuous media portion and a discrete track media portion;
reading the collection of data from the first data recording surface;
writing, at a second data transfer rate, the collection of data to a second data recording surface that is a bit patterned data recording media comprising non-contiguous individual bits of a recording material; and
wherein the first data transfer rate is greater than the second data transfer rate.

9. The method of claim 8, wherein writing the collection of data to the second data recording surface further comprises writing during a period of time identified as being likely to be when the data storage system is otherwise in low demand.

10. The method of claim 8, wherein reading the collection of data from the first data recording surface occurs during a period of time identified as being likely to be when the data storage system is otherwise in low demand.

11. A data storage device comprising a read/write control component that causes data to be transferred from a continuous or discrete track recording surface to a bit patterned recording surface, comprising non-contiguous individual bits of a recording material, during a period of time determined to be likely to be when the data storage device is otherwise in low demand.

12. The data storage device of claim 11, wherein the data read/write control component subsequently causes the data from the bit patterned recording surface to be read at a rate that is more rapid than a rate at which the read/write system wrote the data to the bit patterned recording surface.

13. The data storage device of claim 11, wherein the data storage device includes a collection of error information related to defects in the bit patterned recording surface, and wherein the collection of error information is recorded, within the data storage device, on a media recording surface that may be the same or different than the continuous or discrete track recording surface from which the read/write control component transferred said data to the bit patterned media recording surface.

14. The data storage device of claim 13, wherein the read/write control component accesses and reviews the collection of error information so as to determine where on the bit patterned recording surface the data from the continuous or discrete track recording should not be transferred.

15. The data storage device of claim 11, wherein the continuous or discrete track recording surface is on a first disk and the bit patterned media recording surface is on a second disk, the first disk being separate and distinct from the second disk.

16. The data storage device of claim 15, wherein the data read/write control component adjusts a rotational velocity at which the second disk is rotated such that the data read from the bit patterned recording surface is read at a rate that is different than it was written to the bit patterned recording surface.

17. The data storage device of claim 11, wherein the data storage device further comprises a solid state memory with which the read/write control component is also configured to conduct data read/write operations.

18. A data storage system, comprising:
  at least one recording surface having:
    a first recording surface portion, within the data storage system, that is a bit patterned media surface comprising non-contiguous individual bits of a recording material that enable storage of data at a first areal density;
    a second recording surface portion that is a continuous media portion, a discrete track media portion or a combination of a continuous media portion and a discrete track media portion, the first recording surface portion and the second recording surface portion being within the same data storage system, the second recording surface portion configured to store data at a second areal density that is different from the first areal density; and
    a common data read/write control component, within the same data storage system, configured to manage data read/write operations on both of the first and second recording surface portions at the respective first and second areal densities.

19. The system of claim 18, wherein the second recording surface portion stores a map of defects in the bit patterned media surface.

20. The system of claim 18, wherein the at least one recording surface comprises a first disk surface that includes the first recording surface portion and a second disk surface that includes the second recording surface portion and wherein the data storage system is a single disk drive that comprises the first disk surface, the second disk surface and the common data read/write control component.

21. The system of claim 18 and wherein storage of data on the first recording surface portion and on the second recording surface portion is carried out using perpendicular recording.

* * * * *